G. SANFORD.
Hackling Machine.
No. 35,708.
Patented June 24, 1862.
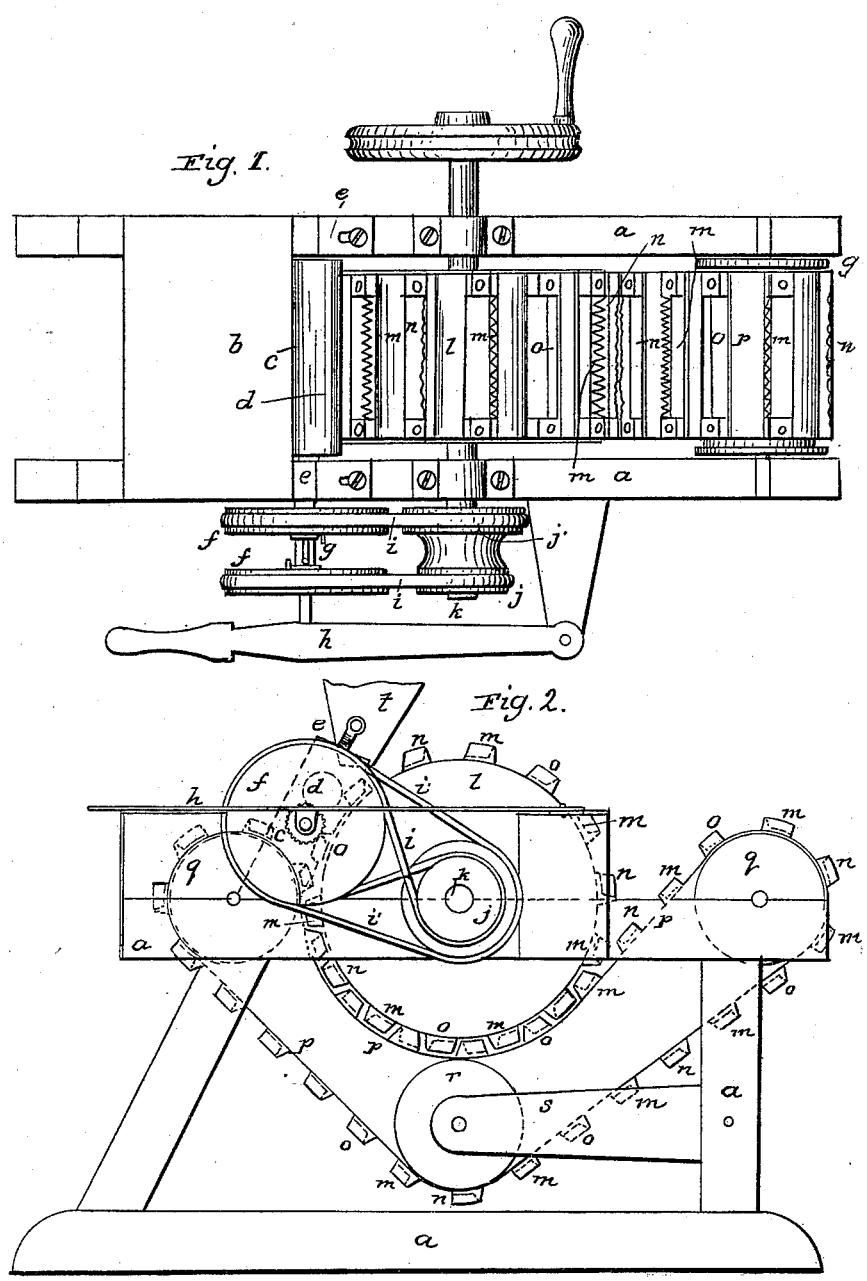

UNITED STATES PATENT OFFICE.

GELSTON SANFORD, OF NEW YORK, N. Y.

IMPROVEMENT IN MACHINERY FOR SEPARATING FIBERS FROM PLANTS.

Specification forming part of Letters Patent No. 35,708, dated June 24, 1862.

*To all whom it may concern:*

Be it known that I, GELSTON SANFORD, of the city, county, and State of New York, have invented certain new and useful Improvements in Machinery for Separating Fibers from the Stalks and Leaves of Fiber-Producing Plants; and I do hereby declare that the following is a full, clear, and exact description thereof, reference being had to the accompanying drawings, making part of this specification, in which—

Figure 1 is a plan, and Fig. 2 a vertical section, of a machine on my improved plan.

The same letters indicate like parts in both the figures.

My said invention relates to improvements in the machine for separating fibers from the stalks or leaves of fiber-producing plants described in and secured by Letters Patent of the United States, granted to me and bearing date the 19th day of February, 1861.

In the accompanying drawings, $a$ represents a suitable frame, and $b$ a table, on which to place the stalks or leaves from which fibers are to be obtained to facilitate the introduction of them into the bite of the feeding and holding rollers $c$ and $d$. The lower one, $c$, of these rollers I prefer to make of metal, and fluted, and its journals mounted in suitable boxes in two standards, $e\ e$, of the frame. On the shaft of this roller, outside the frame, there are two loose pulleys, $f\ f'$, and a sliding clutch, $g$, and clutch-lever $h$, so that by shifting the clutch by the lever both pulleys may be unclutched to turn on the shaft, or either of them may be clutched that the operator may stop or cause the fluted roller to turn in either direction to feed in or draw out the stalks or leaves, for a purpose to be presently described. These two pulleys are driven by belts $i\ i'$ from pulleys $j\ j'$ on the shaft $k$ of the main cylinder, the pulley $j'$ being the largest, that the motion for drawing out the stalks or leaves may be the quickest. Any other equivalent means for stopping and turning this feed-roller in either direction at the will of the operator may be substituted. The upper roller, $d$, is covered with what is known as the "soft compound of vulcanized india-rubber," (other equivalent elastic substance may be substituted,) and its journals are mounted in adjustable boxes in the standards $e\ e$, so that by set-screws or other equivalent means the said elastic roller $d$ may be adjusted relatively to the fluted roller $c$.

Back of the feeding and gripping rollers is the main cylinder $l$, mounted on the shaft $k$. The periphery of this cylinder is covered with vulcanized india-rubber, or equivalent elastic substance, and over this are secured three series of bars, $m$, $n$, and $o$, parallel with each other and with the shaft, and placed at equal distances apart; but instead the bars may be attached directly to the periphery of the cylinder and the elastic covering put on in strips between the bars. The bars $m$ are provided with radial comb-teeth, the bars $n$ are formed with the edge waved, and the bars $o$ formed with a straight edge. An endless band or belt, $p$, made of strong india-rubber cloth, leather, or other suitable material, passes under the main cylinder and around two rollers, $q\ q$—one in front under the feed-table $b$ and the other behind the main cylinder—and this band or belt in the lower part of its circuit passes under a tightening-roller, $r$, hung in arms $s$, which may be drawn down by springs or weights, as is usual with tightening-rollers. The outer surface of this belt or band is armed with three series of bars, $m\ n\ o$, just like the periphery of the main cylinder, and in the same order. The ends of the bars on the cylinder and on the belt are in the form of cogs, and the spaces between them are so proportioned that those on the cylinder fit into the spaces between those on the belt, and vice versa, and in this way the belt is moved by the cylinder, and as the axes of the two rollers $q\ q$, around which the belt passes, are on a level, or nearly so, with the axis of the main cylinder, it follows that the belt passes around the lower half of the circumference of the cylinder, and is drawn tight against it in proportion to the force applied to the tightening-drum, so that the edges of the bars of the belt are thereby forced toward the surface of the cylinder, while the surface of the belt between its bars is forced against the edges of the bars on the cylinder. The belt should be in width equal to the length of the cylinder, and should be made to fit between the end flanges of the rollers $q\ q$ and $r$.

Immediately above the space between the feed-rollers and the main cylinder should be placed a spout, $t$, leading from some suitable reservoir of water, to discharge a stream of water into that space, so as to fall on the stalks or leaves to be treated as they are being acted upon in the machine.

The stalks or leaves of fiber-yielding plants, in the green state and in suitable quantity, are laid and spread on the feeding-table $b$, and one end of them presented to the bite of the feeding and gripping rollers $c$ $d$, and by them firmly gripped and slowly fed into the space between the main cylinder and belt, just under the spout $t$, and the reacted upon, and on opposite sides by the bars $m$ $n$ $o$ on the main cylinder and on the belt, and between them and the surfaces of the cylinder and belt by which they are crushed, and as the bars on the cylinder and belt move much faster than the feed-motion of the rollers the pulpy and other extraneous matter of the stalks or leaves crushed by the grip of the bars is combed and scraped away from the fibers, while a stream of water all the time flows in between the cylinder and belt to wash off the extraneous matter of the plants. After about one-half the length of the stalks or leaves have been thus acted upon, they are drawn out by reversing the motion of the feed-rollers, the combs and scrapers and stream of water continuing their combing, scraping, and cleansing operation, so that when drawn out one-half of the length of the fibers will be found completely separated from all extraneous matter. The other ends of the stalks or leaves are then presented to the bite of the feed-rollers and operated upon in like manner, taking care to feed them in so far as to insure full action on such parts of the length of the fibers as have not been thoroughly separated and cleansed during the first operation. The rollers $c$ and $d$ must not only grip the stalks or leaves to feed them in, but with sufficient force to hold them when under the crushing, scraping, and combing action of the bars on the cylinder and belt, and it is to insure the requisite bite on all the stalks or leaves, as also on all the fibers during the second operation, that the elastic pressure or grip roller $d$ is important, its elastic property enabling it to yield and adapt itself to any variation in the thickness of the material fed in.

Although the other parts of my said invention may be used with solid feeding and gripping rollers, the operation will be found to be much more perfect if used in connection with the elastic gripping and holding roller, and so of the use of water and the treating of the stalks or leaves while in the green state, these are matters which make no part of my invention, as it will be obvious that my said invention can be applied to the separation of fibers from stalks or leaves in the green state without the application of water, provided it be not important to obtain the fibers in the white state, for unless water be supplied during the operation the fibers will be colored more or less by the action of the extraneous substance and the atmosphere; and it will be equally obvious that my said invention is applicable to the separation of fibers from the stalks or leaves of fiber-producing plants after they have been desiccated, or after they have been rotted or "retted," as it is sometimes termed.

What I claim as my invention, and desire to secure by Letters Patent, is—

1. The combination of the cylinder armed, substantially as described, with bars formed for scraping and combing, or either, with the endless belt, also armed, substantially as described, with bars for scraping and combing, or either, substantially as and for the purpose specified.

2. In combination with the cylinder and endless belt, armed with bars, substantially as described, the covering of the periphery of the cylinder with elastic substance between the bars, that the teeth or edges of the bars may act against a yielding surface, the better to perform the operations required, substantially as described.

3. The elastic gripping feed mechanism, substantially as described, in combination with the mechanism, substantially such as described, which crushes the fiber-yielding plants and separates the impurities from the fibers, substantially as described.

4. Arranging the two series of moving combs so that the combs on one of the moving surfaces shall act in the spaces between the combs on the opposite moving surface, substantially as described, and this I claim, whether the two series of combs be attached to a belt and a cylinder, or to any other form of moving surfaces, so long as the said surfaces move at or nearly the same velocity.

GELSTON SANFORD.

Witnesses:
 WM. H. BISHOP,
 A. DE LACY.